April 18, 1961 W. G. GITTINS 2,979,780
PLASTIC FACED BUILDING UNITS AND PROCESS
FOR MANUFACTURING SAME
Filed April 5, 1957
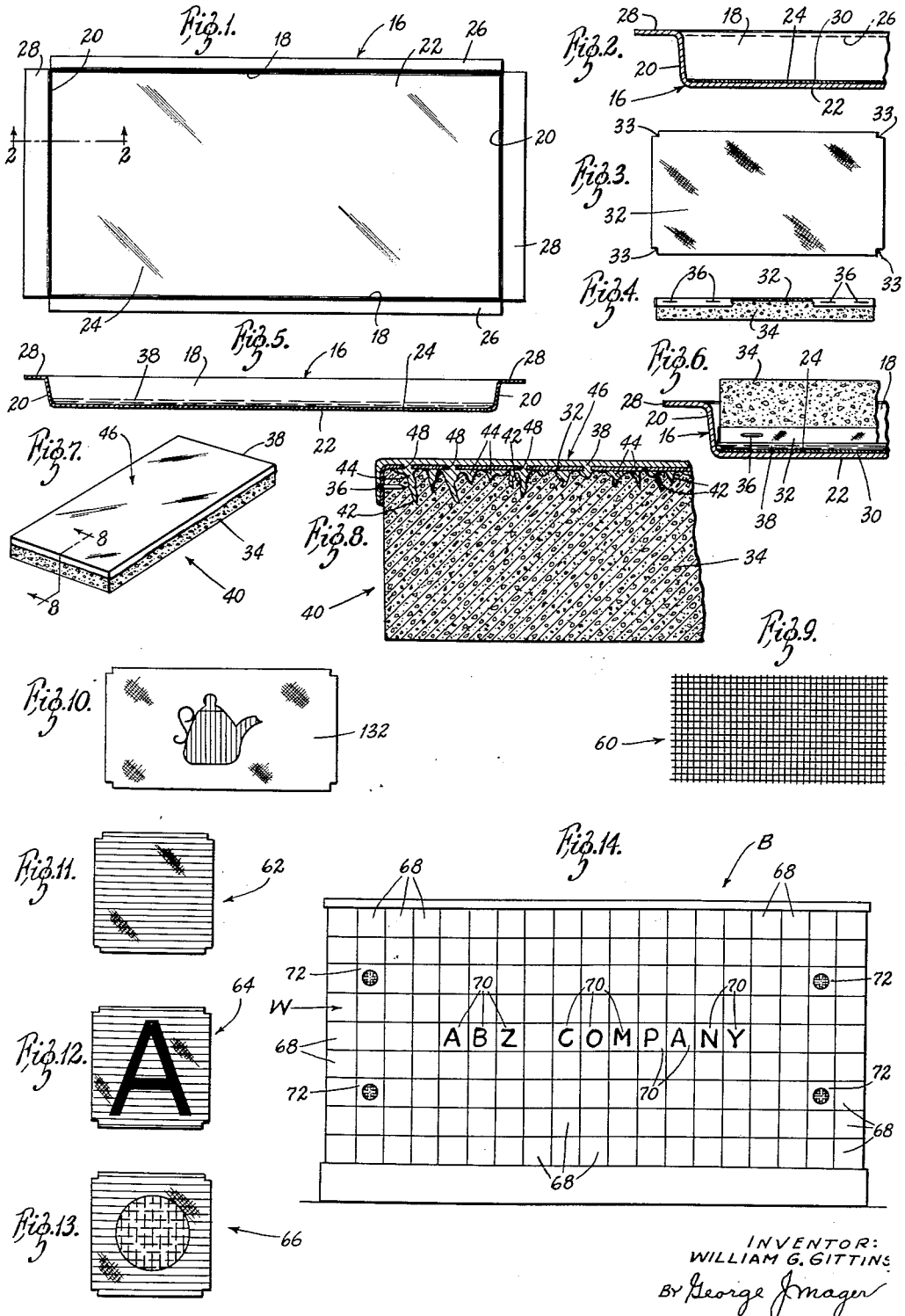
INVENTOR:
WILLIAM G. GITTINS
BY George J Mager
HIS ATTORNEY

United States Patent Office 2,979,780
Patented Apr. 18, 1961

2,979,780

PLASTIC FACED BUILDING UNITS AND PROCESS FOR MANUFACTURING SAME

William G. Gittins, Ladue, Mo.
(8801 Page Ave., St. Louis, Mo.)

Filed Apr. 5, 1957, Ser. No. 650,882

1 Claim. (Cl. 18—61)

The present invention relates to the art of manufacturing blocks, slabs, panels and the like for use in the building construction art.

More particularly, the present invention is directed to a novel process for producing prefabricated building units that are provided with a coating or facing of smooth transparent plastic material bonded to a precast body of concrete or similar material, and having a sheet of permeable material disposed between the plastic facing and the adjacent face portion of the precast body, and integrated therewith.

The permeable material is designed to produce any desired ornamental, decorative, single or varicolored facing. To attain this objective, the invention contemplates the use of sheets of fast color fabric materials such as silk, linen, cloth, and sheets having similar characteristics, for interpositioning and bonding thereof between and to the translucent plastic facing and the adjacent selected face portion of a concrete or haydite building unit.

The invention also contemplates the use of fine or coarse mesh screening that may have a silver, copper, or golden hue, for interpositioning and bonding thereof between and to the plastic facing and the adjacent selected face portion of a precast building unit.

The invention further contemplates the use of fast color sheets of paper that have been perforated, as will be explained, for the attainment of its objectives.

As will be demonstrated hereinafter, the process of this invention is adapted to produce novel ornamental, decorative, as well as informative building units in a simple manner heretofore neither contemplated nor disclosed.

In other words as will appear, the present invention contemplates the production of building units adapted to visually exhibit thereon any desired ornamentation, insignia, emblem and so on, by the incorporation of a permeable or perforated sheet of material whereon said delineations are depicted, between a transparent plastic facing and the selected surface of a precast building unit.

The delineations appearing on the textile or other fabrics and on the perforated paper sheets of material contemplated, may be of a luminous or phosphorescent nature, so that inasmuch as the facing thereover is transparent in accordance with the concepts of this invention, advertising and informative messages may be proclaimed at night without the employment of mechanical means for illumination, as will be understood.

The invention contemplates use of polyester resins resulting in facings that are chemically resistant to acids, and impervious to water, steam and so on, wherefore the processed building units of this invention would be ideal for interior as well as exterior construction purposes.

The principal object of the present invention accordingly, is to provide plastic faced building blocks, slabs, and panels, that may be employed in both interior and exterior building construction.

It is another object of the invention to provide plastic faced building blocks, slabs, panels and the like, that are adapted to exhibit single colors, a plurality of colors, various insignias, emblems, alphabetical and numerical characters, and so on.

It is a further object of the invention to provide a novel process for effecting a permanent bond between a precast body of concrete or similar material, an interposed sheet of permeable material, and a transparent plastic facing.

Another object is to provide a novel process for producing building units having a smooth plastic facing presenting to view any desired solid color, multi-colored design, insignia, or the like, imprinted or otherwise delineated on a permeable sheet of material interposed between the body of said facing and the selected face of a prefabricated building unit.

Further objects of the invention will be apparent or pointed out in the course of the detailed description to follow hereinafter.

Broadly, the invention contemplates the use of a mold in the form of a shallow pan having slightly inwardly tapering side and end walls, and a flat bottom wall. Said mold pan is of stainless steel, and the upper surface of the bottom wall thereof should be highly polished. The configuration of this pan obviously would be predicated on the desired size and shape of the ultimate product. Generally, said pan would be of rectangular contour as viewed in top plan, inasmuch as the present invention is primarily concerned with modular building units. The upper ends of said tapered side and end walls terminate in outwardly projecting flanges that are horizontally disposed and merge in arcuate fashion into said walls. These flanges serves to add rigidity to the mold pan, and likewise facilitate handling thereof.

In practicing the method taught by this invention, a thin coating or film of wax would first be applied to the upper polished surface of the pan bottom wall, whereupon a determined quantity of a polyester resin in liquid state would be introduced into said mold pan. The liquid resin would be poured into the pan gently, and at a temperature of approximately 120 degrees Fahrenheit. Thereupon a precast body of concrete or similar material, dimensioned correspondingly to the mold cavity, would be deposited thereinto. Prior to depositing said precast body into the mold pan however, a sheet of permeable or perforated material having the desired color or colors, design or ornamentation, will have been attached to that surface of the precast body selected for facing. The means employed to this end may vary as will hereinafter appear.

After the sheet of permeable or perforated material had been attached thereto, the precast body would be inverted and lowered gently into the mold pan, and permitted to remain in such status for approximately four hours at a temperature of approximately 80 degrees Fahrenheit. After the indicated time elapse, the pan and its contents would be inverted and deposited onto a flat surface, whereupon said pan could be lifted, thus presenting a finished slab ready for immediate or future use.

An exemplary mold pan, and some of the process steps are illustrated on a sheet of drawings that accompanies this specification. Although as will appear, these drawings pertain primarily to the production of a plastic faced slab, it will be understood that, this particular building unit has been selected merely for illustrative purposes.

A more comprehensive understanding of the invention and its features may be had from the detailed description thereof to follow with reference to said sheet of drawings wherein:

Figure 1 is a top plan view of a mold pan;

Figure 2 is a fragmentary vertical sectional view, on an enlarged scale, taken on the line 2—2 of Figure 1 and demonstrating a film of wax applied to the polished upper surface of the pan bottom wall;

Figure 3 is a top plan view on a reduced scale of a piece of fabric appropriately dimensioned and contoured in accordance with the concepts of this invention;

Figure 4 is an edge view of a prefabricated concrete slab with the Figure 3 piece of fabric secured thereto by means of staples;

Figure 5 is a longitudinal sectional view of said mold pan, illustrating an early step in the process under consideration;

Figure 6 is a fragmentary view similar to Figure 3 but on a larger scale, illustrating a subsequent step;

Figure 7 is a perspective view of a finished slab produced in accordance with the process teachings of the present invention;

Figure 8 is an enlarged and generally diagrammatical sectional view of a fragmentary portion of said finished slab, taken on the line 8—8 of Figure 7;

Figure 9 is a plan view of a piece of screening;

Figure 10 is a plan view of a piece of white fabric appropriately dimensioned and contoured in accordance with the concepts of the present invention and having a fast color red teapot depicted thereon;

Figure 11 is a plan view of a piece of fast color light blue fabric material;

Figure 12 is a plan view of a piece of fast color light blue fabric material whereon an exemplary fast color black capital A is depicted;

Figure 13 is a plan view of a piece of fast color light blue fabric material having a fast color circle of gold depicted thereon; and Figure 14 is a somewhat diagrammatical elevational view of a building wall constructed principally of plastic faced building units produced in accordance with the teachings of this invention, each of said units having incorporated therein one of the fabric pieces of material illustrated in Figures 11, 12, and 13.

In practicing the invention as noted hereinbefore, a mold pan such as that generally designated by the reference numeral 16 would be employed. The illustrated pan 16 is fashioned of stainless steel to include slightly inwardly tapered side walls 18, similar end walls 20, and a flat bottom wall 22. It is important that the upper surface 24 of said bottom wall be highly polished.

The upper ends of the walls 18 terminate in outstanding horizontal flanges 26 that merge arcuately thereinto. Similarly, the upper ends of the walls 20 terminate in outstanding horizontal flanges 28 that merge arcuately thereinto, as seen to best advantage in Figure 2. The flanges 26 and 28 add rigidity to said walls, and the width of each end wall flange 28 is of sufficient extent to facilitate manual lifting of the pan 16.

The process steps involved in the production of a building unit having a smooth plastic facing covering but exhibiting an embedded sheet of permeable or perforated material will now be explained with reference particularly to Figures 2 through 8.

The first step in such process, would be to apply a thin coating or film of wax 30 to the polished upper surface 24 of the mold pan bottom wall 22.

The next step would comprise cutting a sheet of selected permeable material, such as the fabric sheet 32 appearing in Figure 3, to a size which perimeterwise would slightly exceed that of the slab surface to be covered, whereupon preferably but not necessarily, the corners of said sheet would be notched as indicated at 33.

The sheet 32 would next be stretched across the face of the concrete slab 34 and have its marginal portions secured to the side and end face portions of the slab by any appropriate means, such as the staples 36 exemplarily shown in Figure 4. This operation would obviously be facilitated in consequence of providing the corner notches 33.

Thereupon, a sufficient quantity of clear polyester resin in liquid state would be introduced into the pan to provide the facing thickness contemplated in the ultimate building unit. Generally, it has been ascertained by numerous tests that a layer of resin approximately three sixteenths of an inch in thickness is preferable. The last mentioned step is illustrated in Figure 5, the scale of this view being too small to illustrate the wax film 30.

In accordance with the teachings of this invention, the polyester resin 38 should be introduced into the mold pan gently, in order to obviate formation of air globules in the body thereof, and the temperature of said resin material should be approximately 120 degrees Fahrenheit.

Reverting to Figure 4, the slab would next be inverted and gently deposited into the mold pan onto the liquid body of resin 38. Obviously, the bottom 22 of the mold pan 16 and the covered face portion of the slab 34 would be correspondingly dimensioned as is understood. It is to be observed that the arcuate mergings of the flanges 26 and 28 into the tapered side and end walls 18 and 20 respectively of the mold pan 16, facilitate entry of the slab 34 into said pan.

With the precast slab having the fabric sheet 32 affixed thereto in position as demonstrated in Figure 6, the mold pan 16 and its contents would be transferred, via the flanges 28 to an enclosure wherein a temperature of approximately 80 degrees Fahrenheit is maintained. Following a time elapse of four hours, the finished slab would be removed from the mold pan in condition for immediate use, or as is understood, for shipment to a building site.

In consequence of the described treatment, a bond is perfected between the resin 38, the sheet 32 and the promiscuously irregular adjacent face of the precast slab 34. In other words, the resinous material 38 permeates the sheet 32 and either seeps into, or is forced into each and every crevice and interstice theretofore present in the said adjacent face of the slab 34.

The typical ultimate or finished building unit is designated 40 and shown in Figure 7, and a somewhat diagrammatical cross-section of an end portion thereof is presented in Figure 8.

In the last named view, the promiscuously distributed crevices and interstices normally existent in the faces of precast concrete building units typified by the slab 34, are identified by the numerals 42. The crevice and interstice impregnations of the now solidified resinous material 38 are identified by the numerals 44; the smooth planar outer surface of the plastic facing is designated by numeral 46; and some of the interstices in the permeable fabric sheet 32 are designated by the reference numerals 48, it being observed that the showing of these interstices has been exaggerated considerably.

With respect to the sheet of fabric 32, it should now be obvious that by means of the present process, finished building units such as the slab 40 may be produced first of all in any solid color desired. Thus, assuming that building units having white facings were contemplated, white sheets 32 of silk, linen, or similar fabric would be employed. Similarly, should it be desired to produce ultimate building units having solid green color facings, sheets 32 of green silk, linen, or other open mesh textile fabric would be employed, and so on, as should be manifest.

As hereinbefore noted, the resin 38 is of the clear variety. It may however be tinted slightly if desired, thus producing various color shadings and variations. It should also be apparent, that instead of having a solid color, the sheet 32 may be striped, for example in yellow and red. As hereinbefore suggested however, it is important when more than one color is contemplated, that the colors should be fast, so that in the ultimate product, the delineations will appear in clear and concise form.

Another example of what can be accomplished in accordance with the teachings of the present invention will be explained with attention focused on Figure 10. Assuming that a set of plastic-faced slabs or tiles for kitchen walls were contemplated, white sheets of various open mesh textile fabrics whereon selected items of kitchenware and culinary utensils would be depicted in different fast colors could be employed. Thus for example, the sheet 132 depicted in Figure 10 is white, with a teapot delineated thereon in red. Similarly, other white sheets 132 having other kitchen utensils depicted thereon in various fast colors could be used. Further, the sheets could be in colors other than white, and the delineated objects could be in any other selected color than red.

The same idea could be followed with respect for example to a nursery, where the walls could exhibit Mother Goose, Humpty-Dumpty, Little Red Riding Hood, and other characters of nursery rhymes on some of the blocks, each character being delineated in the customary colors associated therewith.

Another analogous idea resides in the use of material such as that exemplified by the piece of screening designated by the numeral 60 and illustrated in Figure 9. This screening may be composed for example, of copper, bronze, or of silver strands.

When employing a piece of material similar to the screening 60, the necessity of stretching and attaching it to the unit 34 would not be required. That is to say, the screening 60 would first be deposited into the mold pan 16 onto the resin body 38, and thereafter the precast building unit would be deposited thereonto, as should be manifest. Obviously, the piece of screening or the like 60 would be dimensioned correspondingly with the adjacent face of the building unit under consideration, and the bottom wall 22 of the mold pan 16. Also, with respect to screening and like material, provision of corner notches would be dispensed with.

As hereinbefore noted, the invention also contemplates the use of fast color paper sheets for the attainment of its objectives. When paper sheets are to be employed, said sheets would first be subjected to a puncturing process, in consequence whereof for example, a crisscross pattern of minute apertures would be formed therein. Consequently, the liquid resin would seep through these apertures when said sheets are subjected to the process of the present invention.

It is noted that obviously, the apertures are preferably so small that they will not be visible in the finished product. The perforating or puncturing device could for example, comprise a plate provided with appropriately spaced depending needles. Thus a sheet of paper, contoured correspondingly to the piece of fabric 32 exhibited in Figure 3, could quickly be punctured in one simple operation. The paper could be of any selected color or colors, and could have a contrastingly colored emblem, trademark, and so on depicted thereon. When punctured sheets of paper are employed, these would also preferably be stretched across one face of the precast building unit, and then stapled thereto in the manner suggested in Figure 4, or the downturned edges thereof could be adhesively secured to the sides and ends of the unit, if more feasible.

From the foregoing description and the drawings, it should be manifest that the present invention provides a process for producing plastic faced building units that are unique in the art, and that may exhibit almost any conceivable color, design, or ornamentation thereon. The use of fast color fabrics embedded in plastic, obviates fading even under the most adverse conditions. It is also noted that the plastic facings add strength to the building units, and in an erected wall and the like, they also form protective coverings for the body portions of said units.

With attention directed now to Figures 11 through 14, an explanation of one important use of building blocks fabricated in accordance with the concepts of the present invention will be given. It is believed that this explanation, together with the description hereinbefore, should suffice for a comprehensive understanding of the extraordinary possibilities inherent in the present invention.

In Figure 14, there is presented a somewhat diagrammatical side elevational view of a building B such as a factory, the wall W whereof is constructed of building blocks fabricated in accordance with the concepts of this invention.

For illustrative purposes, building units or blocks of square contour have been chosen as shown. Each of the blocks included in the wall W, incorporates therein either the sheet of fabric 62 shown in Figure 11, the sheet of fabric 64 shown in Figure 12, or the sheet of fabric 66 shown in Figure 13.

Although in the interest of clarity, the accepted horizontal line indication of the color blue has been omitted in Figure 14 blocks, such lines do appear on the sheets 62, 64, and 66, wherefore it will be understood that blue had been the predominant color chosen for the wall W. It is therefore believed manifest, that all of the wall blocks which are facsimiles of those designated 68, will have been fabricated in accordance with the teachings of this invention by the incorporation of a sheet of blue fabric 62 in each of them.

Assuming now that the building B is the property of the "ABZ COMPANY," the blocks 70 spelling out this name would be fabricated in accordance with the teachings of the instant invention by the incorporation of a sheet of blue fabric 64 in each of them, it being considered manifest that the letter "A" appearing in Figure 12, typifies all of the alphabetical characters.

It will further be assumed that the "ABZ Company" is the proprietor of a trademark, and that said trademark for example, comprises a yellow or golden circle as depicted on the blue background of the Figure 13 sheet of fabric designated 66. It will further be assumed that said company desired its mark to be displayed symmetrically or otherwise on the wall W. In the exemplary arrangement demonstrated in Figure 14, four of the included blocks, each designated by the numeral 72, would therefore have been fabricated in accordance with the teachings of the present invention by the incorporation in them of a fabric sheet of material 66 having a blue background surrounding a circle of gold, the colors being fast as noted hereinbefore.

It is believed that the foregoing explanation, description, and the drawings present an adequate disclosure for a complete comprehension of the objectives of my invention, and that further elaboration would be prolix.

What I claim is:

That method of bonding an externally smooth transparent plastic facing to a promiscuously irregular face of a precast concrete building unit with a sheet of permeable decorative material interposed between said facing and said face which comprises the following steps: applying a film coating of wax to the highly polished upper surface of the bottom wall of a shallow stainless mold pan having slightly tapered side and end walls; cutting a sheet of permeable material to a size that perimeterwise slightly exceeds the size of said promiscuously irregular face of the precast concrete building unit; notching the four corner portions of said sheet; stretching the sheet across said face and securing its marginal edges to the adjacent side and end faces of the building unit; gently introducing into said mold pan a sufficient quantity of clear polyester resin to provide the facing thickness contemplated, said resin being in liquid form and heated to a temperature of approximately 120 degrees Fahrenheit; gently depositing said building unit with the sheet covered face thereof downward onto the resin in the mold pan, subjecting the mold pan and its contents to a constant temperature of approximately 80 degrees Fahrenheit for a period of four hours to allow the resin to harden; inverting the mold pan and its contents and depositing same onto a flat surface; and lifting the mold pan from the building unit.

References Cited in the file of this patent
UNITED STATES PATENTS

| | | |
|---|---|---|
| 146,479 | Sanderson | Jan. 13, 1874 |
| 1,403,143 | Atwood et al. | Jan. 10, 1922 |
| 1,908,395 | Wright | May 9, 1933 |
| 1,920,120 | Woodruff | July 25, 1933 |
| 2,298,724 | Reach | Oct. 13, 1942 |
| 2,644,781 | Smolak et al. | July 7, 1953 |
| 2,646,380 | Barlow et al. | July 21, 1953 |
| 2,667,664 | Ferrell | Feb. 2, 1954 |
| 2,752,275 | Raskin et al. | June 26, 1956 |
| 2,805,448 | Rubenstein | Sept. 10, 1957 |